United States Patent
Awad

(10) Patent No.: US 9,769,719 B2
(45) Date of Patent: Sep. 19, 2017

(54) NETWORK ELEMENTS, WIRELESS COMMUNICATION SYSTEM AND METHODS THEREFOR

(71) Applicant: IP.Access Limited, Cambridge (GB)

(72) Inventor: Akram Jamal Masoud Awad, Cambridge (GB)

(73) Assignee: IP.Access Ltd., Cambridge (GB)

( * ) Notice: Subject to any disclaimer, the term of this patent is extended or adjusted under 35 U.S.C. 154(b) by 239 days.

(21) Appl. No.: 14/651,914

(22) PCT Filed: Dec. 9, 2013

(86) PCT No.: PCT/EP2013/075910
§ 371 (c)(1),
(2) Date: Jun. 12, 2015

(87) PCT Pub. No.: WO2014/090721
PCT Pub. Date: Jun. 19, 2014

(65) Prior Publication Data
US 2015/0334613 A1  Nov. 19, 2015

(30) Foreign Application Priority Data
Dec. 13, 2012 (GB) .................................... 1222473.9

(51) Int. Cl.
*H04W 4/00* (2009.01)
*H04W 36/00* (2009.01)
(Continued)

(52) U.S. Cl.
CPC ....... *H04W 36/0094* (2013.01); *H04W 24/08* (2013.01); *H04W 72/0453* (2013.01); *H04W 24/10* (2013.01); *H04W 84/045* (2013.01)

(58) Field of Classification Search
CPC combination set(s) only.
See application file for complete search history.

(56) References Cited

U.S. PATENT DOCUMENTS

| | | | | |
|---|---|---|---|---|
| 2011/0319076 A1* | 12/2011 | Ramasamy | ........... | H04W 48/16 455/434 |
| 2012/0076018 A1* | 3/2012 | Singh | ................ | H04W 36/0083 370/252 |
| 2013/0079003 A1* | 3/2013 | Nagaraja | ................ | H04W 24/02 455/435.1 |

FOREIGN PATENT DOCUMENTS

| EP | 2205023 | 7/2010 |
|---|---|---|
| EP | 2509353 | 10/2012 |

(Continued)

OTHER PUBLICATIONS

3rd Generation Partnership Project; Technical Specification Group Radio Access Network; Radio Resource Control (RRC); Protocol specification (Release 11), 3GPP Draft; Draft 25331-B30 UPDATE2, 3rd Generation Partnership Project (3GPP), Mobile Competence Centre; 650, Route Des Lucioles; F-06921 Sophia-Antipolis Cedex; France; Sep. 24, 2012 (Sep. 24, 2012), XP050664289, Retrieved From.

*Primary Examiner* — Frank Duong
(74) *Attorney, Agent, or Firm* — Optimus Patents US, LLC

(57) ABSTRACT

An Access Point (105) serving a small cell (202) in a cellular communication system (100) uses the User Equipment intra-frequency Primary Scrambling Code detection mode to detect neighbors inter-frequency by switching its carrier frequency to a frequency on which it is desired to check for neighbors (for a period long enough and/or often enough for it UE to have a reasonable chance of detecting such a neighbor). Received measurements on such neighbor cells (202, 203) may be used to compile a neighbor cell list if no such list has been preconfigured in the Access Point or if network listen results have provided only a limited number of detected neighbor cells.

14 Claims, 5 Drawing Sheets

(51) Int. Cl.
  *H04W 24/08* (2009.01)
  *H04W 72/04* (2009.01)
  *H04W 84/04* (2009.01)
  *H04W 24/10* (2009.01)

(56) References Cited

FOREIGN PATENT DOCUMENTS

WO  2011/082988  7/2011
WO  2012/135120  10/2012

* cited by examiner

NETWORK ELEMENTS, WIRELESS COMMUNICATION SYSTEM AND METHODS THEREFOR

FIELD OF THE INVENTION

The field of this invention relates to network elements, a wireless communication system and methods therefor.

BACKGROUND

Wireless communication systems, such as the $3^{rd}$ Generation (3G) of mobile telephone standards and technology, are well known. An example of such 3G standards and technology is the Universal Mobile Telecommunications System (UMTS™), developed by the $3^{rd}$ Generation Partnership Project (3GPP™) (www.3gpp.org). The $3^{rd}$ generation of wireless communications has generally been developed to support macro-cell mobile phone communications. Such macro cells utilise high power base stations (NodeBs in 3GPP parlance) to communicate with wireless communication units within a relatively large geographical coverage area. Typically, wireless communication units, or User Equipment (UEs) as they are often referred to in 3G parlance, communicate with a Core Network (CN) of the 3G wireless communication system via a Radio Network Subsystem (RNS). A wireless communication system typically comprises a plurality of radio network subsystems, each radio network subsystem comprising one or more cells to which UEs may attach, and thereby connect to the network. Each macro-cellular RNS further comprises a controller, in a form of a Radio Network Controller (RNC), operably coupled to the one or more Node Bs, via a so-called Iub interface.

The second generation wireless communication system (2G), also known as GSM, is a well-established cellular, wireless communications technology whereby "base transceiver stations" (equivalent to the Node B's of the 3G system) and "mobile stations" (user equipment) can transmit and receive voice and packet data. Several base transceiver stations are controlled by a Base Station Controller (BSC), equivalent to the RNC of 3G systems.

Communications systems and networks are developing towards a broadband and mobile system. The 3rd Generation Partnership Project has proposed a Long Term Evolution (LTE) solution, namely, an Evolved Universal Mobile Telecommunication System Territorial Radio Access Network, (E-UTRAN), for a mobile access network, and a System Architecture Evolution (SAE) solution, namely, an Evolved Packet Core (EPC), for a mobile core network. An evolved packet system (EPS) network provides only packet switching (PS) domain data access so voice services are provided by a 2G or 3G Radio Access Network (RAN) and circuit switched (CS) domain network. User Equipment (UE) can access a CS domain core network through a 2G/3GRAN such as the (Enhanced Data Rate for GSM Evolution, EDGE) Radio Access Network (GERAN) or a Universal Mobile Telecommunication System Terrestrial Radio Access Network (UTRAN), and access the EPC through the E-UTRAN.

Some user equipments have the capability to communicate with networks of differing radio access technologies. For example, a user equipment may be capable of operating within a UTRAN and within an E-UTRAN.

Lower power (and therefore smaller coverage area) cells are a recent development within the field of wireless cellular communication systems. Such small cells are effectively communication coverage areas supported by low power base stations. The terms "picocell" and "femtocell" are often used to mean a cell with a small coverage area, with the term femtocell being more commonly used with reference to residential small cells. Small cells are often deployed with minimum RF (radio frequency) planning and those operating in consumers' homes are often installed in an ad hoc fashion. The low power base stations which support small cells are referred to as Access Points (AP's) with the term Home Node B (HNB's) or Evolved Node Node B (eHNB) identifying femtocell Access Points. Each small-cell is supported by a single Access Point. These small cells are intended to augment the wide area macro network and support communications to multiple User Equipment devices in a restricted, for example, indoor environment. An additional benefit of small cells is that they can offload traffic from the macro network, thereby freeing up valuable macro network resources An HNB is an Access Point that provides a wireless interface for user equipment connectivity. It provides a radio access network connectivity to a user equipment (UE) using the so-called Iuh interface to a network Access Controller, also known as a Home Node B Gateway (HNB-GW). One Access Controller (AC) can provide network connectivity of several HNB's to a core network.

Typical applications for such Access Points include, by way of example, residential and commercial locations, communication 'hotspots', etc., whereby Access Points can be connected to a core network via, for example, the Internet using a broadband connection or the like. In this manner, small cells can be provided in a simple, scalable deployment in specific in-building locations where, for example, network congestion or poor coverage at the macro-cell level may be problematic.

In some applications, small Access Points (or Home Node B's are provided with a network listen device or module which listens to broadcasts from base stations (eg. Access Points, Node B's and Home Node B's) serving neighbouring cells.

Thus, an AP is a scalable, multi-channel, two-way communication device that may be provided within, say, residential and commercial (e.g. office) locations, 'hotspots' etc, to extend or improve upon network coverage within those locations. Although there are no standard criteria for the functional components of an AP, an example of a typical AP for use within a 3GPP 3G system may comprise Node-B functionality and some aspects of Radio Network Controller (RNC) functionality as specified in 3GPP TS 25.467. These small cells are intended to be able to be deployed alongside the more widely used macro-cellular network and support communications to UEs in a restricted, for example 'in-building', environment.

Herein, the term "small cell" means any cell having a small coverage area and includes "picocells" and "femtocells."

In a planned cellular network, a so-called neighbour cell list is used to identify adjacent cells to each cell, to facilitate handover of UE communications from a "source" cell to a "target" cell when the strength or quality of the signal from the serving (source) cell, for example, becomes too poor to maintain the communication. The neighbour cell list is broadcast to UEs to enable the UE to receive and assess the suitability of continuing a communication by transferring the communication to an adjacent (neighbour) cell. A neighbour cell list contains, inter alia, cell ID, frequency and scrambling code information for all of the cells whose coverage area overlaps with the UE's current serving cell, to allow the UE to be able to receive and decode transmissions from the neighbouring cells and send back measurement reports. A UE can use, for example, the conventional intra-frequency PSC detection mode to detect neighbouring cells operating with the same ARFCN (Absolute Radio Frequency Channel Number) and send measurement reports back to its serving node B or AP. Such measurement reports can include signal levels and signal quality of the transmissions from a detected cell. An Access Point may be provisioned with a neighbour cell list prior to deployment In other arrangements, an AP may not be provisioned with a neighbour cell list but instead, it may configure the list itself based on measurements of signals (broadcast by neighbouring cells) detected by its network listen module.

For an AP that relies on its network listen module to self-configure a neighbouring cell list, a problem arises when the network listen scan does not result in finding any neighbouring cells, either intra-frequency (co-channel) or inter-frequency. In such cases, the risk of a UE close to the cell edge dropping a call is increased since no handover target cell has been identified. A similar problem can arise in cases where the network listen module has found only intra-frequency neighbouring cells but the system Operator has disabled intra-frequency handover for that particular AP. Even if the network listen module does find one or more neighbouring cells, the any neighbour cell list that the AP may subsequently compile will be incomplete if there are other neighbouring cells which are "visible" to the UE but not to the network listen module. Having a limited number of configured neighbouring cells in a neighbour cell list can have a deleterious effect on the stability of any handover process.

SUMMARY OF THE INVENTION

Accordingly, the invention seeks to mitigate, alleviate or eliminate the above-mentioned disadvantage.

Aspects of the invention provide network elements, a wireless communication system and methods therefor as described in the appended claims.

According to a first aspect of invention there is provided a method for detecting neighbour cells in a wireless communication system which comprises a first cell served by the network element and at least one neighbouring cell, the method including, at the network element;
  (a) allocating a set of operating frequencies for the network element,
  (b) selecting an operating frequency for the network element from the set of allocated operating frequencies,
  (c) transmitting an instruction to a wireless communication unit located in the first cell to send measurement reports of neighbour cells which are operating on the selected operating frequency, and receiving and storing said measurement reports,
  (d) after a predetermined time period has elapsed, selecting another operating frequency for the network element from the set, and
  (e) receiving measurement reports from a wireless communication unit of neighbour cells which are operating on said another operating frequency, and storing said measurement reports.

The method may further include; repeating steps (d) and (e) until all operating frequencies included in the set have been selected.

The stored measurement reports may be used to assist in compiling a neighbour cell list for use by the network element. An operating frequency may be a carrier frequency.

The pre-determined time period may be set for a period long enough for a wireless communication unit to have a reasonable chance of detecting a neighbour cell. In one embodiment, the network element is an Access Point which provides small cell coverage for one or more User Equipments.

The invention exploits the mandatory requirement (in 3GPP systems) for a User Equipment to report detected intra-frequency neighbouring cells in order to detect inter-frequency neighbours. The invention has the advantage of enabling an Access Point to compile a neighbour cell list when its network listen module cannot find any inter-frequency neighbours or when it wants to explore the possibility of discovering new inter-frequency neighbours that might be visible to a UE but not to the APs network listen module. The invention can also be advantageously deployed in instances where inter-frequency measurement reporting from a UE is not possible due to limitations in the radio access network or UE capabilities. Another instance in which the invention can be advantageously deployed is where an Access Point has been configured to rely on SIB 11 or SIB 12 (System Information Block) messages from neighbour cells in order to configure a UE for discovery of neighbours not discovered by its network listen device but the network listen device has not discovered any neighbouring cells and therefore does not have the neighbouring cell SIB 11 and SIB 12 message content. SIB 11 and SIB 12 messages.

An Access Point may be configured with three groups of frequencies. The first group can be the set of frequencies from which the Access Point is allowed to select an operating frequency in normal situations. The second group can be the set of frequencies that the Access Point needs to scan for neighbours. The third group can be the set of frequencies from which the Access Point is allowed to temporarily use as an operating frequency in order to exploit at least some aspects of the invention. The content of the three groups may overlap. Hence, the invention allows an Access Point to temporarily transmit on a frequency that it is not usually allowed to use but only when its network listen results justify such a use and the network listen results suggest that there will be no or minimal interference on other neighbouring cells that might be transmitting on the same frequency.

The invention can be deployed in live mode, that is while a User Equipment is receiving communication services in a serving cell and using either circuit switched or packet switched connections or both. The invention can also be deployed when a User Equipment is merely "camped on to" (or "registered with") the serving cell but not actually receiving or transmitting communication signals to or from a core network.

In one embodiment, selecting another operating frequency for the network element from the set is co-incident with a commencement of a network listen session performed at the network element; ie. the changes of operating frequency may be configured to coincide with periodic network listen cycles.

To improve the rediscovery of an Access Point by User Equipments that are already camped on to It but not in a call, the Access Point may include information relating to the new chosen operating frequency that it is planning to change over to as part of a Reselection SIB broadcast message. In the case where a User Equipment is in an ongoing call, information relating to the new chosen operating frequency may be sent in an Information Element in a Physical Channel Reconfiguration message. The change of operating frequency may be made to look like a handover as far as the User Equipment is concerned so that by the time the User Equipment has switched its frequency and started looking for the target cell (which would be the Access Point itself) the Access Point would have changed its operating frequency. Hence, the method may further include transmitting a message to the wireless communication unit including information relating to an imminent change in operating frequency. In one example, the message transmitted to the wireless communication unit may comprise a handover message. In another example, the message transmitted to the wireless communication unit may comprise a cell selection System Information message or a cell reselection System Information message as appropriate.

If the Access Point is forced to go offline i.e. not serve any user during the network listen cycle, no special notification is required for the frequency change as the User Equipment will discover the operation of the Access Point on a particular frequency through a conventional frequency spectrum scan.

In one example, in addition to discovering new neighbouring cells, the invention can be extended to assist an Access Point to self-configure its own carrier frequency based on whether an intra-frequency or inter-frequency cell reselection or handover is preferred.

According to a second aspect of the invention, there is provided a network element for supporting communications in a wireless communication system which includes a first cell served by the network element and at least one neighbouring cell wherein the network element includes a signal processor arranged to select a first operating frequency for the network element from a predefined set of operating frequencies, and after a predetermined period of time, to select a subsequent operating frequency for the network element, different from the first frequency, from said set, to receive measurement reports, from a wireless communication unit, of neighbouring cells which are operating either on the first frequency or at least one subsequent frequency, and a store for storing said received measurement reports.

The stored received measurement reports may be used to assist in compiling a neighbour cell list. The network element may comprise an Access Point serving a small cell, a Home Node B serving a femto cell or a node B serving a macrocell, for example. The signal processor of the network element may be implemented in one or more integrated circuits.

According to a third aspect of the invention there is provided a wireless communication system arranged to support the method and network element of the above aspects.

According to a fourth aspect of the invention, there is provided tangible computer program product having an executable computer program code stored thereon for execution by a processor to perform a method in accordance with the first aspect.

The tangible computer program product may comprise at least one from a group consisting of: a hard disk, a CD-ROM, an optical storage device, a magnetic storage device, a Read Only Memory, a Programmable Read Only Memory, an Erasable Programmable Read Only Memory, an Electrically Erasable Programmable Read Only Memory and a Flash memory.

These and other aspects, features and advantages of the invention will be apparent from, and elucidated with reference to, the embodiments described hereinafter.

BRIEF DESCRIPTION OF THE FIGURES

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Further details, aspects and embodiments of the invention will be described, by way of example only, with reference to the drawings. Elements in the figures are illustrated for simplicity and clarity and have not necessarily been drawn to scale. Like reference numerals have been included in the respective drawings to ease understanding.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

The inventive concept finds particular applicability in a cellular communication system that supports a number of overlapping communication coverage areas, for example a communication system that comprises a combination of small cells and macro cells.

Those skilled in the art will recognize and appreciate that the specifics of the specific examples described are merely illustrative of some embodiments and that the teachings set forth herein are applicable in a variety of alternative settings. For example, since the inventive concepts do not depend on any particular combination of radio access technologies (RAT), it is envisaged that the inventive concepts can be applied to other RAT's and combinations thereof although 3G systems are shown in the embodiments. As such, other alternative implementations within cellular communication systems conforming to different standards are contemplated and are within the scope of the various teachings described.

Figure 1:
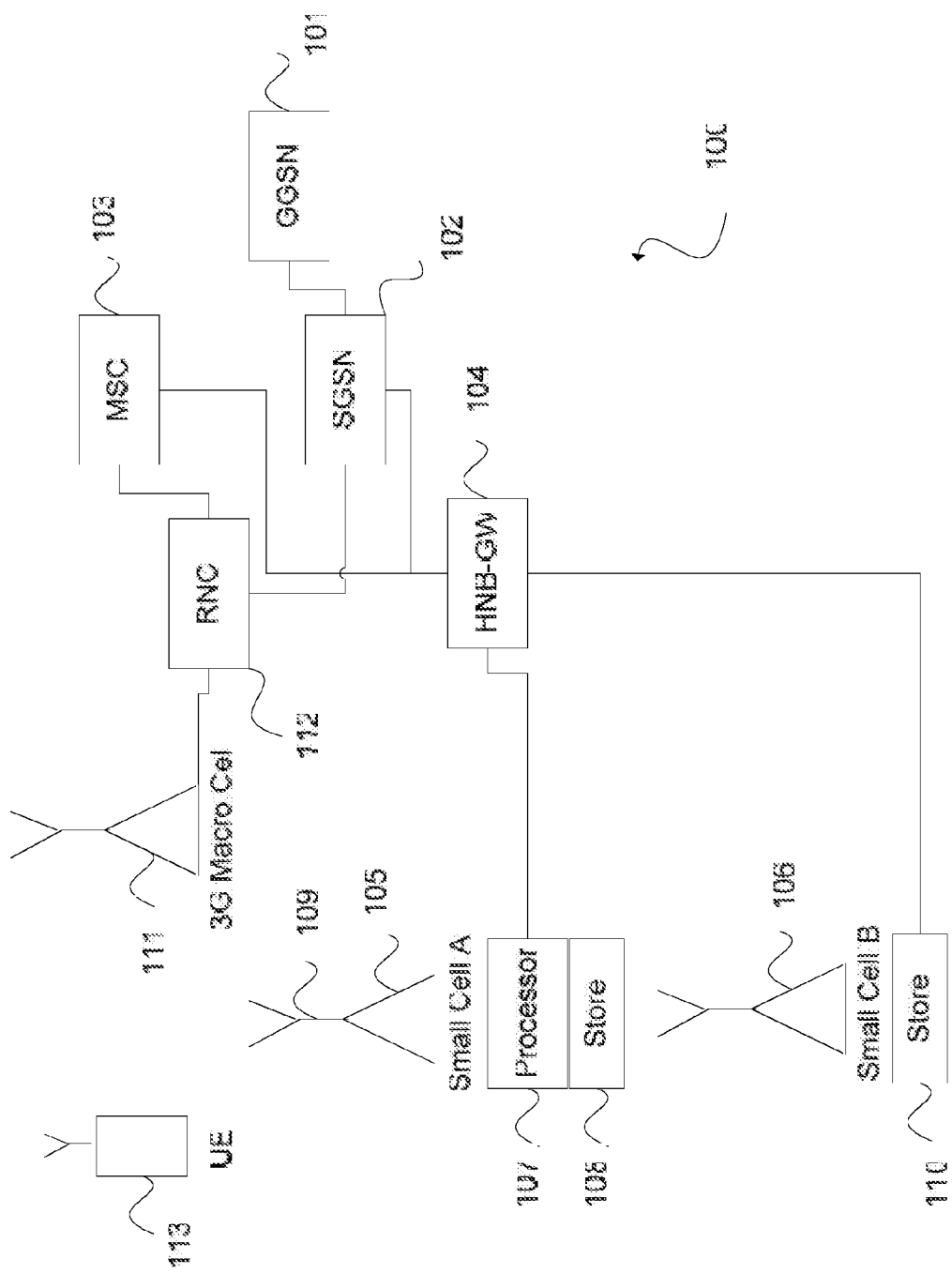
FIG. 1 illustrates a part of a cellular communication system operating in accordance with an example embodiment.

Referring now to FIG. 1, an example of part of a wireless communication system operating in accordance with embodiments of the invention is illustrated and indicated generally at 100 and comprises a UMTS (UTRAN) small cell (cell A), a UMTS (UTRAN) small cell (cell B) and a 3G macro cell (cell C). Although in this example two small cells and one macrocell are shown, it will be understood that the invention is by no means limited to this configuration. Further, it does not necessarily require the co-operation of two small cells. Other configurations, for example, one small cell and one macrocell or one small cell and two macrocells are possible.

A core network of the Wireless Communications System of FIG. 1 includes a Gateway General Packet Radio System (GPRS) Support Node (GGSN) 101 and a Serving GPRS Support Node (SGSN) 102. The GGSN 101 or SGSN 102 is responsible for interfacing the wireless communication system 100 with a packet data network, for example a Public Switched Data Network (PSDN), (such as the internet) or a Public Switched Telephone Network (PSTN). The SSGN 102 performs a routing and tunnelling function for traffic to and from the cells A, B and C while the GGSN 101 links with external packet networks.

UMTS small cells A and B are linked to the SSGN 102 and to a Mobile Switching Centre (MSC) 104 through a Home Node B Gateway (HNB-GW) 103. Each small cell A and B is served by an associated Access Point (AP) 105 and 106 respectively. A first Access Point 105 serving cell A is provided with a signal processing module 107 and a store 108 whose functionalities will be described below.

The signal processing module 106 may be programmed by a computer program product such as a flash memory which is incorporated in the AP 105. The first Access Point 105 is also provided with a network listen device 109. The second Access Point 106 is provided with a store 110 in which is stored a neighbour cell list. The 3G macro-cell C is served by a Node B 111 which is controlled by a Radio Network Controller (RNC) 112. The RNC 112 is linked to the SGSN 102 and to the Mobile Switching Centre 103. A User Equipment 113 is able to move through the coverage areas of cells A, B and C and communicate with the core network via either AP 105 or 106 or node B 111.

Figure 2:
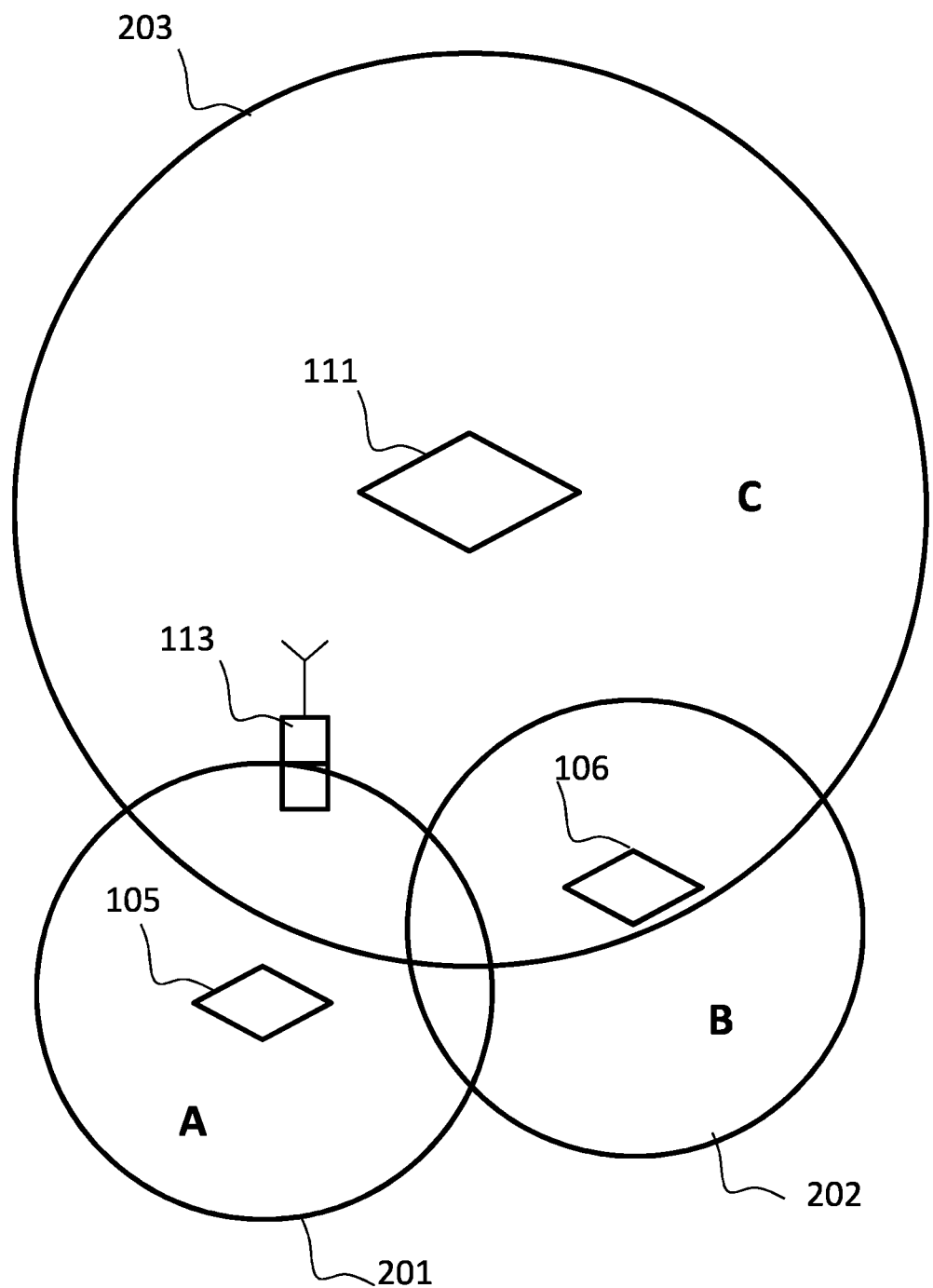
FIG. 2 illustrates an example of an arrangement of cells comprising the cellular communication system of FIG. 1.

Coverage areas 201, 202, 203 of cells A, B and C respectively are shown schematically in FIG. 2 In FIG. 2, the cells A, B and C are all adjacent to one another and therefore cells B and C are neighbours to cell A. In this example, the distance from the first Access Point 105 which serves cell A two the node B 101 serving cell C is greater than the distance from the second Access Point 106 which serves cell B to the node B 111. A User Equipment (UE) 113 is located on the edge of cell A and also close to an edge of cell B and cell C and currently camped on to (or registered with) cell A.

The first Access Point 105 is allocated (by a conventional management system (not shown)) a set of operating frequencies which it is allowed to use for communications with the User Equipment. These operating frequencies may be, for example, carrier frequencies each characterised by an ARFCN. A first of these operating frequencies is also allocated to cell B as its only operating frequency. Therefore when cell A is operating on this first frequency, cells A and B are co-channel (intra frequency) but may be assigned different primary scrambling codes. Cell C is assigned an operating frequency different from that assigned to cell B but in common with one of the frequencies in the set allocated to cell A. So when the first Access Point 105 is operating on the first frequency, cell A and cell C will be inter-frequency cells.

The second Access Point 106 which serves cell B is pre-provisioned with a neighbour cell list which is held in the store 110. This neighbour cell list identifies cells B and C and possibly other cells (not shown). The store 108 of the first Access point 105 which serves cell A on the other hand does not contain a pre-provisioned neighbour cell list. Instead the Access Point 105 self-configures such a list.

In one example of operation, the network listen module 109 associated with the first Access Point 105 listens for broadcast transmissions from neighbouring cells. However, the network listen module 109 fails to detect any transmissions from neighbouring cells. It fails to detect neighbouring macrocell C (because the distance is too great) and fails to detect neighbouring small cell B (because of some obstruction such as a building, for example). However, the UE 113 on the edge of cell A is in a location such that it can detect transmissions from the macrocell's node B 111 and the second Access Point 106.

In another example, the network listen module 109 detects at least one of the macrocell C or the small cell B (and possibly other cells adjacent cells (not shown)) but the signal processor 107 decides that more neighbours need to be discovered or that any discovered neighbour is not suitable for handover (if handover to other Access Points is not permitted, for example).

So, based on pre-configured parameters or on network listen results the signal processor 107 decides that the UE 113 (and any other UE's camped on to cell A) will need to be exploited in order to detect undiscovered inter-frequency neighbouring cells that might have coverage overlap with cell A. Therefore, instead of the Access Point (AP) 105 configuring itself to permanently use one carrier frequency (e.g. as it might conventionally do if the AP is statically determined or if configuration was based on network listen interference results), the signal processor 107 configures the AP 105 to use one or more other frequencies and to switch from one frequency to another (in the case of multiple frequencies) in a dynamic or pre-defined fashion (e.g. cycling between frequencies every X hours or days and then reverting to a period of operation whereby the first frequency is used for a predefined period before commencing a cycling operation again). Preferably, when switching from one frequency to another the Access Point remains operating on a chosen frequency for a period long enough and/or often enough for a UE to have a reasonable chance of detecting a neighbour and reporting measurements.

Using standard measurement control messages, the AP 105 configures the UE 113 to measure and report intra-frequencies detected set measurements. The capability to perform and report this type of measurement is currently mandatory for all UEs regardless of their 3GPP release (up to and including Release 9).

The signal processor 107 can choose to continue the switching of frequencies until all frequencies in an allocated set have been used and then repeat the process. Alternatively, when all frequencies have been used, the signal processor 107 can terminate the switching process and revert to using the first frequency or another frequency which has been determined either from network listen interference results or from the received intra-frequency detected cell set measurements. The measurements received from the UE relating to newly-detected neighbouring cells are stored in the store 108 and may be used to compile a neighbour cell list.

Figure 3:
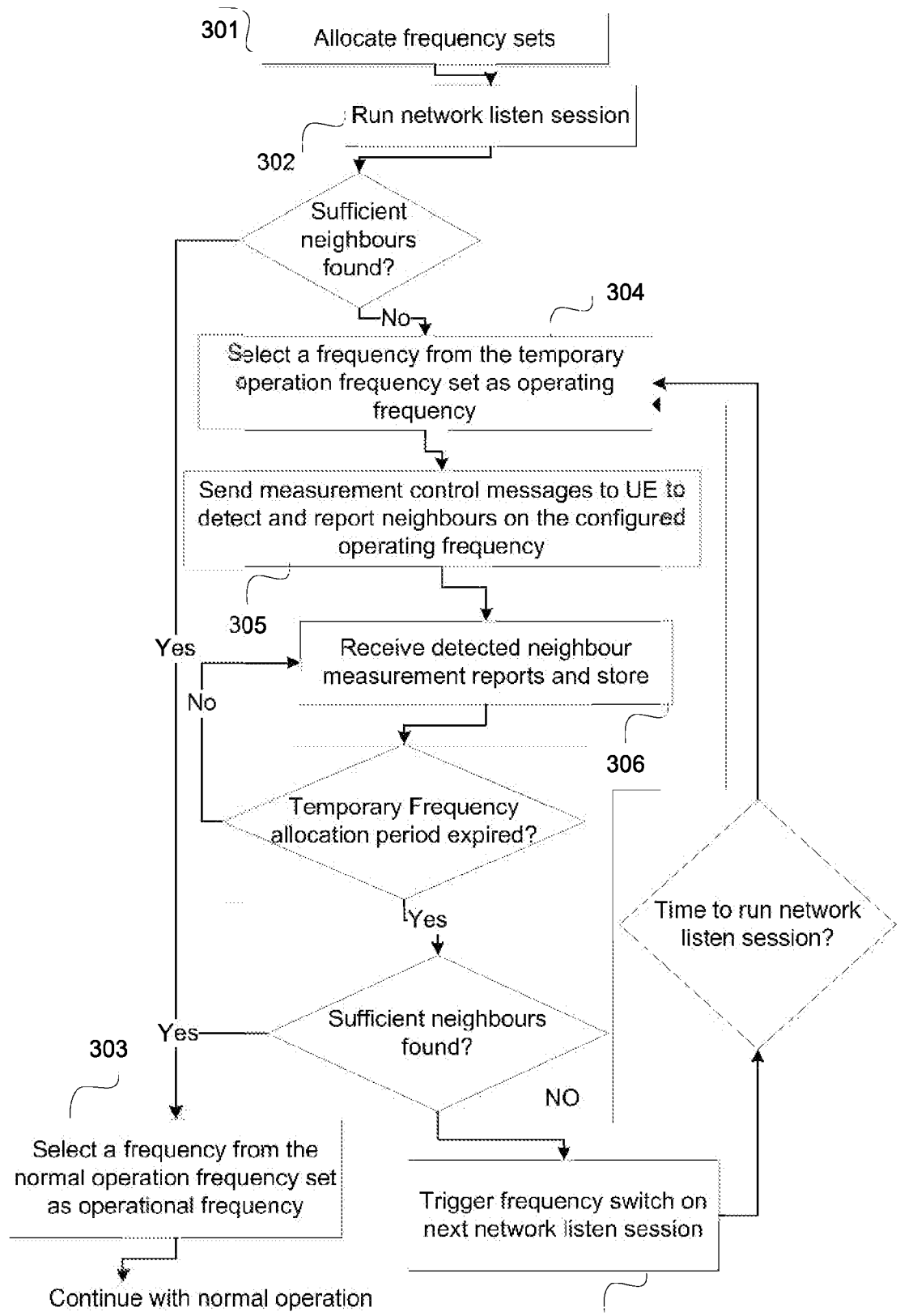
FIG. 3 is a flow chart illustrating first and second examples of a method for detecting neighbour cells.

Referring now to the simplified flowchart of FIG. 3, a first example of a method 300 of detecting neighbours at the first Access Point 105 will now be described. At 301 the first Access Point 105 is configured with a first set of frequencies from which the Access Point is allowed to select an operating frequency for conventional operation. It is also configured with a second set of frequencies that it can use to scan for neighbours. It is further provided with a third set of frequencies, each frequency in this third set being one which the Access Point is allowed to temporarily use as an operating frequency in a manner to be described below.

At 302, the Access Point runs a conventional network listen session by scanning frequencies in the second set to discover inter-frequency neighbour cells. If sufficient neighbours are found, then at 303, the Access Point selects an operating frequency from the first frequency set and continues with normal (conventional) operation.

If insufficient or no neighbours are found during the network listen session, then at 304, the signal processor 107 selects a first frequency from the third set as the Access Point's (temporary) operating frequency.

At 305 the Access Point 105 sends measurement control messages for reception by the UE 113 instructing the UE to look for neighbours operating on the selected first operating frequency and to send measurement reports back to the Access Point ie. the UE is put into intra-frequency PSC detection mode.

At 306 the Access Point 105 receives measurement reports from the UE 113 relating to detected neighbour cells and stores the reports. Once a pre-set time period has expired, and sufficient neighbours have been detected, the process reverts to 303 and normal operation of the Access Point can resume. If, on the other hand, insufficient or no neighbours are detected after the pre-set time period has elapsed, then the process loops back to 304 where another frequency, different from the first, is selected form the third set as the Access Point's (temporary) operating frequency. In a second example of operation, instead of immediately selecting another frequency from the third set once the pre-set time period has expired, at 307, this selection step is triggered to occur co-incidentally with a next scheduled network listen session.

Figure 4:
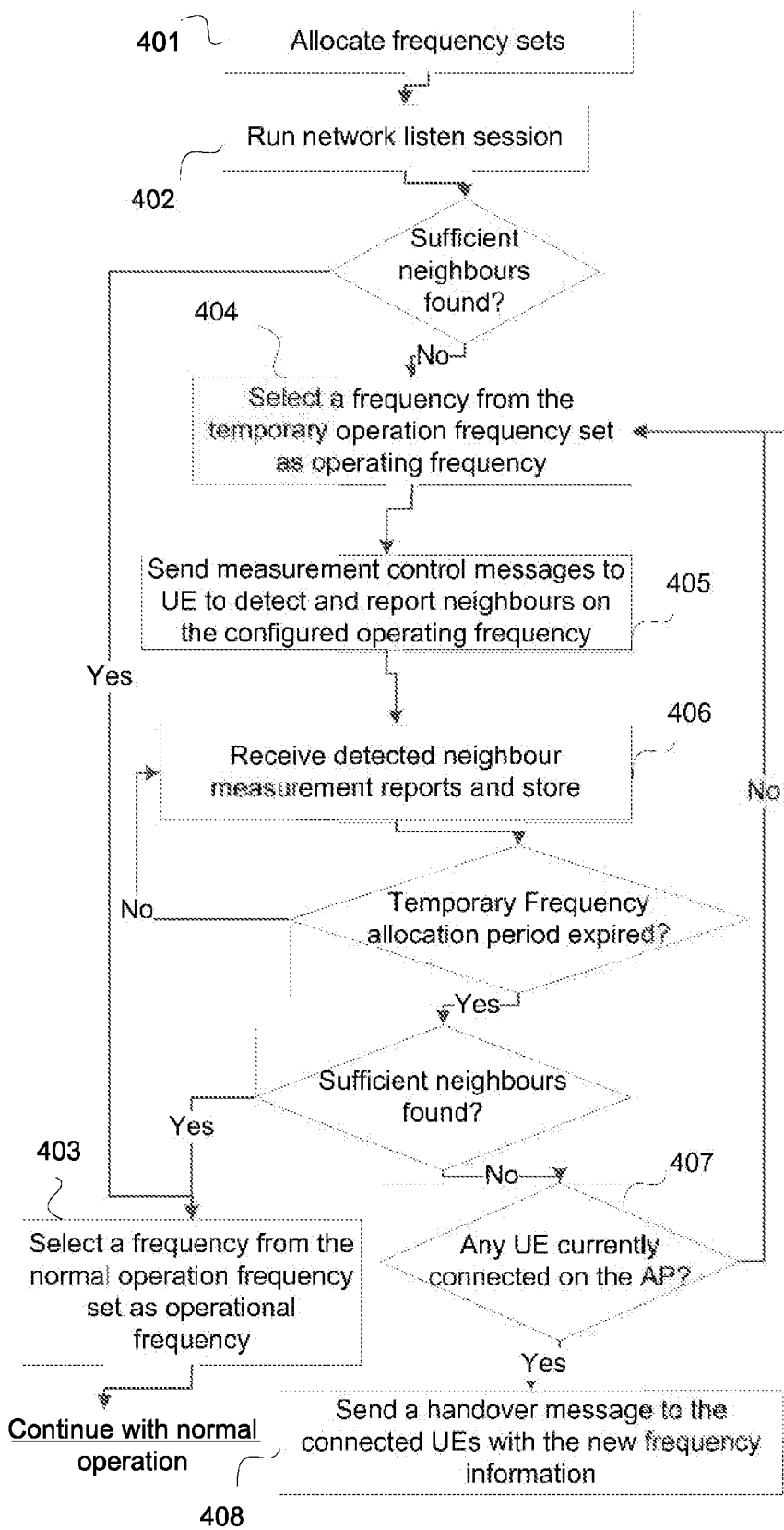
FIG. 4 is a flow chart illustrating a third example of a method for detecting neighbour cells.

Referring now to the simplified flowchart of FIG. 4, a third example of a method of detecting neighbours at the first Access Point 105 will be described. At 401 the first Access Point 105 is configured with a first set of frequencies from which the Access Point is allowed to select an operating frequency for conventional operation. It is also configured with a second set of frequencies that it can use to scan for neighbours. It is further provided with a third set of frequencies, each frequency in this third set being one which the Access Point is allowed to temporarily use as an operating frequency in a manner to be described below.

At 402, the Access Point runs a conventional network listen session by scanning frequencies in the second set to discover inter-frequency neighbour cells. If sufficient neighbours are found, then at 403, the Access Point selects an operating frequency from the first frequency set and continues with normal (conventional) operation. If insufficient or no neighbours are found during the network listen session, then at 404, the signal processor 107 selects a first frequency from the third set as the Access Point's (temporary) operating frequency.

At 405 the Access Point 105 sends measurement control messages for reception by the UE 113 instructing the UE to look for neighbours operating on the selected first operating frequency and to send measurement reports back to the Access Point i.e. the UE is put into intra-frequency PSC detection mode.

At 406 the Access Point 105 receives measurement reports from the UE 113 relating to detected neighbour cells and stores the reports. Once a pre-set time period has expired, and sufficient neighbours have been detected, the process reverts to 403 and normal operation of the Access Point can resume.

If, on the other hand, insufficient or no neighbours are found, then at 407 the Access Point determines whether or not there are any UE's which are currently connected to the Access Point. If no UE's are connected, then the process loops back to step 404 where another frequency, different from the first, is selected form the third set as the Access Point's (temporary) operating frequency. If it is determined that one or more UE's are connected to the Access Point, then at 408, the Access Point send a handover message (in a conventional manner) to the connected UE(s) which includes information relating to a new frequency that the Access Point intends to select from the third set of frequencies.

The process subsequently reverts to 404 where the new frequency is selected as the temporary operating frequency for the Access Point. Any connected UE receiving the handover message will configure itself so that the connection with the Access Point will be maintained (via a handover process) even though the Access Point has switched to the new (temporary) operating frequency. The measurement request message (step 405) subsequently sent to the UE will elicit measurement reports on neighbour cells operating on the new selected frequency (with the UE still operating in intra-frequency PSC detection mode).

Figure 5:
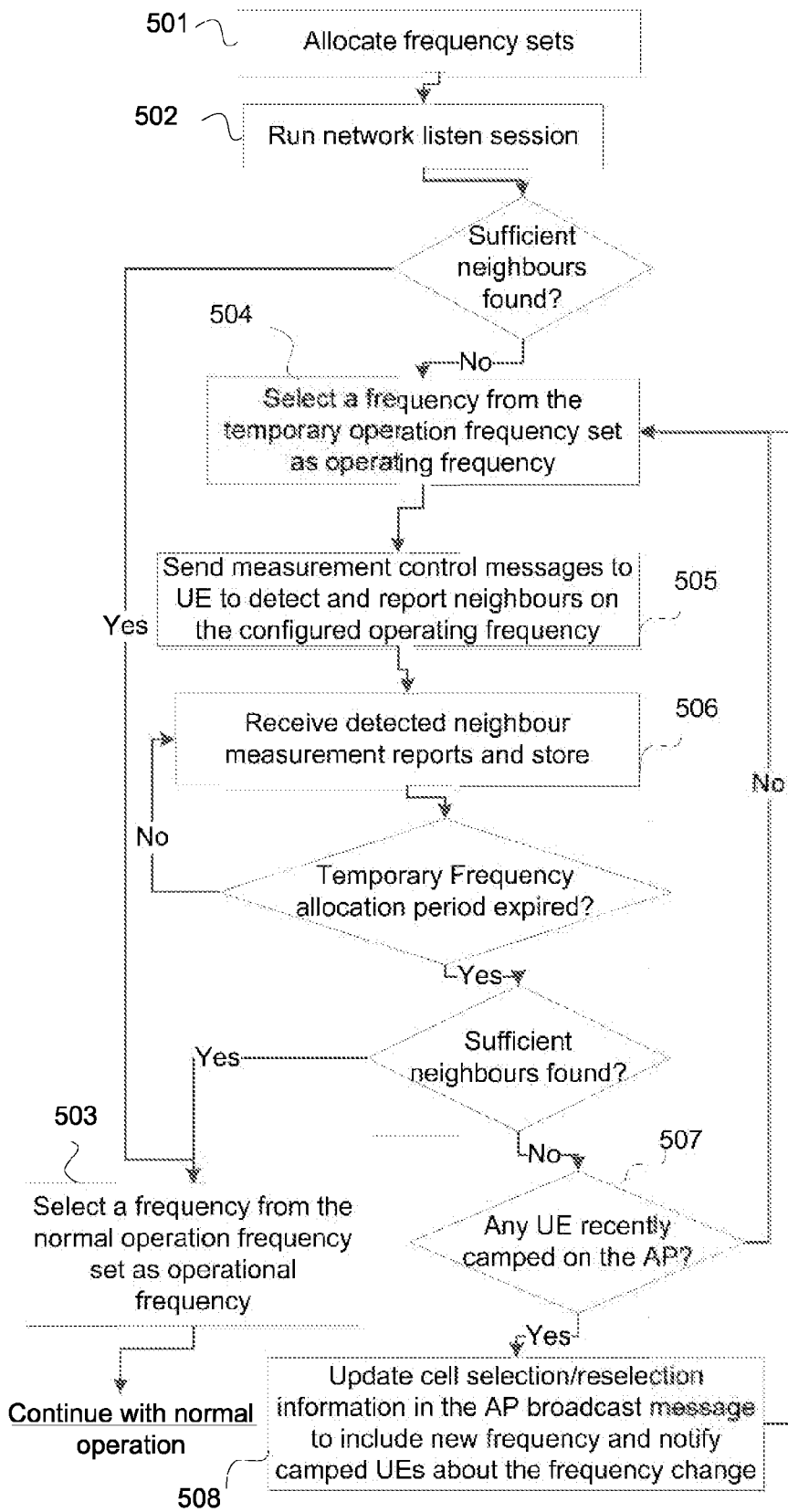
FIG. 5 is a flow chart illustrating a fourth example of a method for detecting neighbour cells.

Referring now to the simplified flowchart of FIG. 5, a fourth example of a method of detecting neighbours at the first Access Point 105 will be described.

At 501 the first Access Point 105 is configured with a first set of frequencies from which the Access Point is allowed to select an operating frequency for conventional operation. It is also configured with a second set of frequencies that it can use to scan for neighbours. It is further provided with a third set of frequencies, each frequency in this third set being one which the Access Point is allowed to temporarily use as an operating frequency in a manner to be described below.

At 502, the Access Point runs a conventional network listen session by scanning frequencies in the second set to discover inter-frequency neighbour cells. If sufficient neighbours are found, then at 503, the Access Point selects an operating frequency from the first frequency set and continues with normal (conventional) operation.

If insufficient or no neighbours are found during the network listen session, then at 504, the signal processor 107 selects a first frequency from the third set as the Access Point's (temporary) operating frequency.

At 505 the Access Point 105 sends measurement control messages for reception by the UE 113 instructing the UE to look for neighbours operating on the selected first operating frequency and to send measurement reports back to the Access Point i.e. the UE is put into intra-frequency PSC detection mode.

At 506 the Access Point 105 receives measurement reports from the UE 113 relating to detected neighbour cells and stores the reports. Once a pre-set time period has expired, and sufficient neighbours have been detected, the process reverts to 503 and normal operation of the Access Point can resume.

If, on the other hand, insufficient or no neighbours are found, then at 507 the Access Point determines whether or not there are any UE's which are camped onto or have recently camped onto the Access Point. If no UE's have camped on, then the process loops back to step 504 where another frequency, different from the first, is selected form the third set as the Access Point's (temporary) operating frequency. If it is determined that one or more UE's are or have recently been camped onto the Access Point, then at 508, the Access Point sends cell selection or re-selection information in a broadcast message in a conventional manner for reception by the UE(s). This message includes information relating to a new frequency that the Access Point intends to select from the third set of frequencies.

The process subsequently reverts to 504 where the new frequency is selected as the temporary operating frequency for the Access Point. Any UE receiving the broadcast message will configure itself so that it reselects the Access Point once the Access Point has switched to the new (temporary) operating frequency. The measurement request message (step 505) subsequently sent to the UE will elicit measurement reports on neighbour cells operating on the new selected frequency (with the UE still operating in intra-frequency PSC detection mode).

The signal processing functionality of the embodiments of the invention, particularly the signal processor 107 may be achieved using computing systems or architectures known to those who are skilled in the relevant art. Computing systems such as, a desktop, laptop or notebook computer, hand-held computing device (PDA, cell phone, palmtop, etc.), mainframe, server, client, or any other type of special or general purpose computing device as may be desirable or appropriate for a given application or environment can be used. The computing system can include one or more processors which can be implemented using a general or special-purpose processing engine such as, for example, a microprocessor, microcontroller or other control module.

The computing system can also include a main memory, such as random access memory (RAM) or other dynamic memory, for storing information and instructions to be executed by a processor. Such a main memory also may be used for storing temporary variables or other intermediate information during execution of instructions to be executed by the processor. The computing system may likewise include a read only memory (ROM) or other static storage device for storing static information and instructions for a processor.

The computing system may also include an information storage system which may include, for example, a media drive and a removable storage interface. The media drive may include a drive or other mechanism to support fixed or removable storage media, such as a hard disk drive, a floppy disk drive, a magnetic tape drive, an optical disk drive, a compact disc (CD) or digital video drive (DVD) read or write drive (R or RW), or other removable or fixed media drive. Storage media may include, for example, a hard disk, floppy disk, magnetic tape, optical disk, CD or DVD, or other fixed or removable medium that is read by and written to by media drive. The storage media may include a computer-readable storage medium having particular computer software or data stored therein.

In alternative embodiments, an information storage system may include other similar components for allowing computer programs or other instructions or data to be loaded into the computing system. Such components may include, for example, a removable storage unit and an interface, such as a program cartridge and cartridge interface, a removable memory (for example, a flash memory or other removable memory module) and memory slot, and other removable storage units and interfaces that allow software and data to be transferred from the removable storage unit to computing system.

The computing system can also include a communications interface. Such a communications interface can be used to allow software and data to be transferred between a computing system and external devices. Examples of communications interfaces can include a modem, a network interface (such as an Ethernet or other NIC card), a communications port (such as for example, a universal serial bus (USB) port), a PCMCIA slot and card, etc. Software and data transferred via a communications interface are in the form of signals which can be electronic, electromagnetic, and optical or other signals capable of being received by a communications interface medium.

In this document, the terms 'computer program product', 'computer-readable medium' 'non-transitory computer-readable medium' and the like may be used generally to refer to tangible media such as, for example, a memory, storage device, or storage unit. These and other forms of computer-readable media may store one or more instructions for use by the processor comprising the computer system to cause the processor to perform specified operations. Such instructions, generally referred to as 'computer program code' (which may be grouped in the form of computer programs or other groupings), when executed, enable the computing system to perform functions of embodiments of the present invention. Note that the code may directly cause a processor to perform specified operations, be compiled to do so, and/or be combined with other software, hardware, and/or firmware elements (e.g., libraries for performing standard functions) to do so.

In an embodiment where the elements are implemented using software, the software may be stored in a computer-readable medium and loaded into computing system using, for example, removable storage drive. A control module (in this example, software instructions or executable computer program code), when executed by the processor in the computer system, causes a processor to perform the functions of the invention as described herein.

Furthermore, the inventive concept can be applied to any circuit for performing signal processing functionality within a network element. It is further envisaged that, for example, a semiconductor manufacturer may employ the inventive concept in a design of a stand-alone device, such as a microcontroller of a digital signal processor (DSP), or application-specific integrated circuit (ASIC) and/or any other sub-system element.

It will be appreciated that, for clarity purposes, the above description has described embodiments of the invention with reference to a single processing logic. However, the inventive concept may equally be implemented by way of a plurality of different functional units and processors to provide the signal processing functionality. Thus, references to specific functional units are only to be seen as references to suitable means for providing the described functionality, rather than indicative of a strict logical or physical structure or organisation.

Aspects of the invention may be implemented in any suitable form including hardware, software, firmware or any combination of these. The invention may optionally be implemented, at least partly, as computer software running on one or more data processors and/or digital signal processors or configurable module components such as FPGA devices. Thus, the elements and components of an embodiment of the invention may be physically, functionally and logically implemented in any suitable way. Indeed, the functionality may be implemented in a single unit, in a plurality of units or as part of other functional units.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term 'comprising' does not exclude the presence of other elements or steps.

Furthermore, although individually listed, a plurality of means, elements or method steps may be implemented by, for example, a single unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather indicates that the feature is equally applicable to other claim categories, as appropriate.

Furthermore, the order of features in the claims does not imply any specific order in which the features must be performed and in particular the order of individual steps in a method claim does not imply that the steps must be performed in this order. Rather, the steps may be performed in any suitable order. In addition, singular references do not exclude a plurality. Thus, references to 'a', 'an', 'first', 'second', etc. do not preclude a plurality.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

I claim:

1. A method for detecting neighbour cells in a wireless communication system which comprises a first cell served by a network element and at least one neighbouring cell, the method comprising, at the network element:
    (a) allocating a set of operating frequencies for the network element,
    (b) selecting an operating frequency for the network element from the set of allocated operating frequencies,
    (c) transmitting an instruction to a wireless communication unit located in the first cell to enter an intra-frequency detection mode and send intra-frequency measurement reports relating to neighbour cells that are operating on the selected operating frequency used by the network element, and receiving and storing said intra-frequency measurement reports,
    (d) after a predetermined time period has elapsed, switching to another operating frequency from the set of allocated operating frequencies to receive further intra-frequency measurement reports, and
    (e) receiving said further intra-frequency measurement reports from the wireless communication unit relating to neighbour cells that are operating on said another operating frequency, and storing said further intra-frequency measurement reports.

2. The method of claim 1, including; repeating steps (d) and (e) until all operating frequencies included in the set have been selected.

3. The method of claim 1, wherein selecting another operating frequency for the network element from the set is co-incident with a commencement of a network listen session performed at the network element.

4. The method of claim 1, wherein at the network element, transmitting a message to the wireless communication unit including information relating to an imminent change in operating frequency.

5. The method of claim 4, wherein the message transmitted to the wireless communication unit comprises a handover message.

6. The method of claim 4, wherein the message transmitted to the wireless communication unit comprises a cell selection System Information message.

7. The method of claim 4, wherein the message transmitted to the wireless communication unit comprises a cell reselection System Information message.

8. The method of claim 1, further comprising configuring the network element with:
    a first set of frequencies, from which the network element is allowed to select an operating frequency for wireless communication;
    a second set of frequencies for scanning for inter-frequency neighbour cells; and
    the set of allocated operating frequencies, each frequency in the set of allocated operating frequencies being a frequency which the network element is allowed to use temporarily as an operating frequency for scanning for intra-frequency neighbour cells.

9. The method of claim 8, wherein,
    prior to selecting an operating frequency for the network element from the set of allocated operating frequencies, the network element runs a network listen session by scanning frequencies in the second set of frequencies to discover inter-frequency neighbour cells, and:
        when sufficient neighbours are found during the network listen session, then the network element selects an operating frequency from the first frequency set and continues with wireless communication on that frequency; or
        when insufficient or no neighbours are found during the network listen session, then the network element selects the operating frequency from the set of allocated operating frequencies to use temporarily as an operating frequency for scanning for intra-frequency neighbour cells.

10. A tangible computer program product having an executable computer program code stored thereon for execution by a processor to perform a method of detecting neighbour cells in a wireless communication system which comprises a first cell served by a network element and at least one neighbouring cell, the method comprising, at the network element:
    (a) allocating a set of operating frequencies for the network element,
    (b) selecting an operating frequency for the network element from the set of allocated operating frequencies,
    (c) transmitting an instruction to a wireless communication unit located in the first cell to enter an intra-frequency detection made and send intra-frequency measurement reports relating to neighbour cells that are operating on the selected operating frequency used by the network element, and receiving and storing said intra-frequency measurement reports,
    (d) after a predetermined time period has elapsed, switching to another operating frequency from the set of allocated operating frequencies to receive further intra-frequency measurement reports, and
    (e) receiving said further intra-frequency measurement reports from the wireless communication unit relating to neighbour cells that are operating on said another operating frequency, and storing said further intra-frequency measurement reports.

11. The tangible computer program product of claim 10, comprising at least one from a group consisting of: a hard disk, a CD-ROM, an optical storage device, a magnetic storage device, a Read Only Memory, a Programmable Read Only Memory, an Erasable Programmable Read Only Memory, an Electrically Erasable Programmable Read Only Memory and a Flash memory.

12. A network element for supporting communications in a wireless communication system which includes a first cell served by the network element and at least one neighbouring cell, wherein the network element comprises:
   a signal processor arranged to select a first operating frequency for the network element from a predefined set of operating frequencies, and
   a transmitter arranged to transmit an instruction to a wireless communication unit located in the first cell to enter an intra-frequency detection mode and send intra-frequency measurement reports relating to neighbour cells that are operating on the selected operating frequency used by the network element,
   a receiver arranged to receive said intra-frequency measurement reports; and
   a store arranged to store said received intra-frequency measurement reports, wherein
   the network element is arranged, after a predetermined period of time, to switch to another operating frequency from the set of allocated operating frequencies to receive further intra-frequency measurement reports, the another operating frequency being different from the first operating frequency, and
   the receiver is further arranged to receive said further intra-frequency measurement reports from the wireless communication unit, of neighbouring cells that are operating either on the first frequency or at least one subsequent frequency, and
the store is arranged to store said received further intra-frequency measurement reports.

13. The network element of claim 12, wherein the signal processor is implemented in one or more integrated circuits.

14. A wireless communication system comprising a network element as claimed in claim 12.

* * * * *